United States Patent
Capan et al.

(10) Patent No.: US 6,769,652 B1
(45) Date of Patent: Aug. 3, 2004

(54) MOUNTING FOR PRESSURE LINE

(75) Inventors: Iso Capan, Niederfüllbach (DE); Egid Macht, München (DE)

(73) Assignee: FTE automotive GmbH (DE)

( * ) Notice: Subject to any disclaimer, the term of this patent is extended or adjusted under 35 U.S.C. 154(b) by 0 days.

(21) Appl. No.: 09/661,174

(22) Filed: Sep. 13, 2000

(30) Foreign Application Priority Data

Sep. 16, 1999 (DE) .......................................... 199 44 600

(51) Int. Cl.$^7$ ............................................... F16C 3/00
(52) U.S. Cl. ..................................................... 248/65
(58) Field of Search ........................ 248/68.1, 65, 903, 248/71

(56) References Cited

U.S. PATENT DOCUMENTS

| | | | |
|---|---|---|---|
| 2,432,492 A | * | 12/1947 | Tinnerman |
| 4,005,942 A | * | 2/1977 | Gilb |
| 4,074,491 A | | 2/1978 | Bell et al. |
| 4,189,807 A | | 2/1980 | Byerly |
| 4,340,244 A | | 7/1982 | Scott |
| 5,178,479 A | | 1/1993 | Brown et al. |
| 5,257,768 A | | 11/1993 | Juenemann et al. |
| 6,409,223 B1 | | 6/2002 | Bartholomä |

FOREIGN PATENT DOCUMENTS

| | | |
|---|---|---|
| DE | 1 955 504 | 5/1971 |
| DE | 2218250 | 4/1972 |
| DE | 1 389 448 | 4/1975 |
| DE | 24 35 995 A1 | 2/1976 |
| DE | 30 04 421 | 11/1981 |
| DE | 26 00 725 C2 | 8/1982 |
| DE | 35 14 315 C2 | 7/1986 |
| DE | 42 30 889 A1 | 3/1994 |
| DE | 195 44 222 | 6/1997 |
| DE | 299 09 715 U1 | 10/1999 |
| EP | 0 272 370 A1 | 6/1988 |
| EP | 0 666 628 A1 | 8/1995 |
| GB | 2 284 005 A | 5/1995 |

* cited by examiner

Primary Examiner—Alvin Chin-Shue
(74) Attorney, Agent, or Firm—McAndrews, Held & Malloy, Ltd.

(57) ABSTRACT

A mounting is disclosed for a pressure line, in particular a brake line, which comprises a pipe part connected with a hose portion by means of a connector, which pipe part may be connected to a pressure connection of a housing, in particular of a brake caliper, by means of a fitting. A retaining clip is provided which has a first portion, by means of which the pressure line may be supported at the connector or the pipe part, and comprises a second portion connected rigidly with the first portion, by means of which second portion the retaining clip may be fixed to the housing via the fitting. Thus, a mounting of simple design is provided for the pressure line, which assists or ensures secure and reliable connection of the pressure line to the pressure connection.

11 Claims, 4 Drawing Sheets

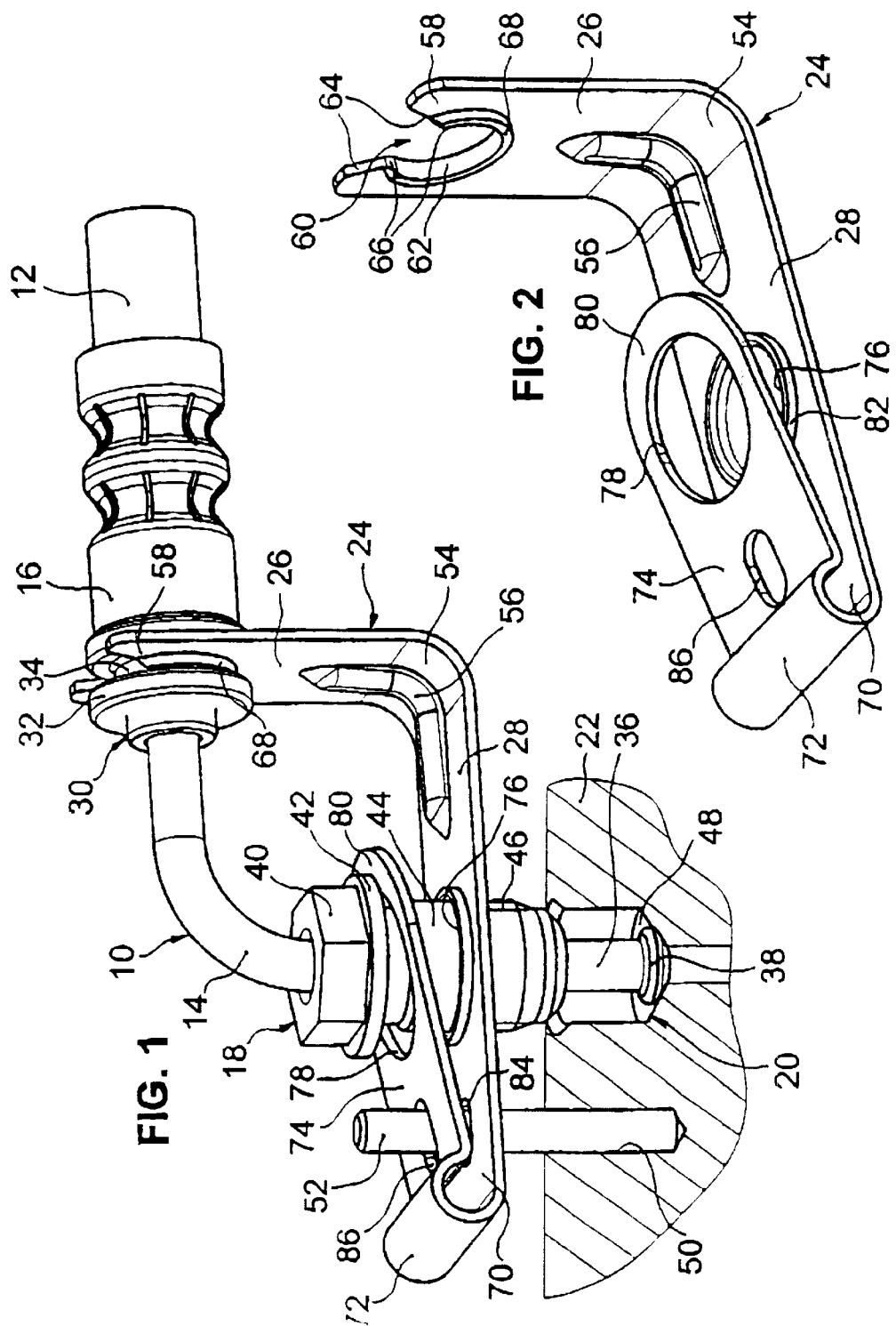

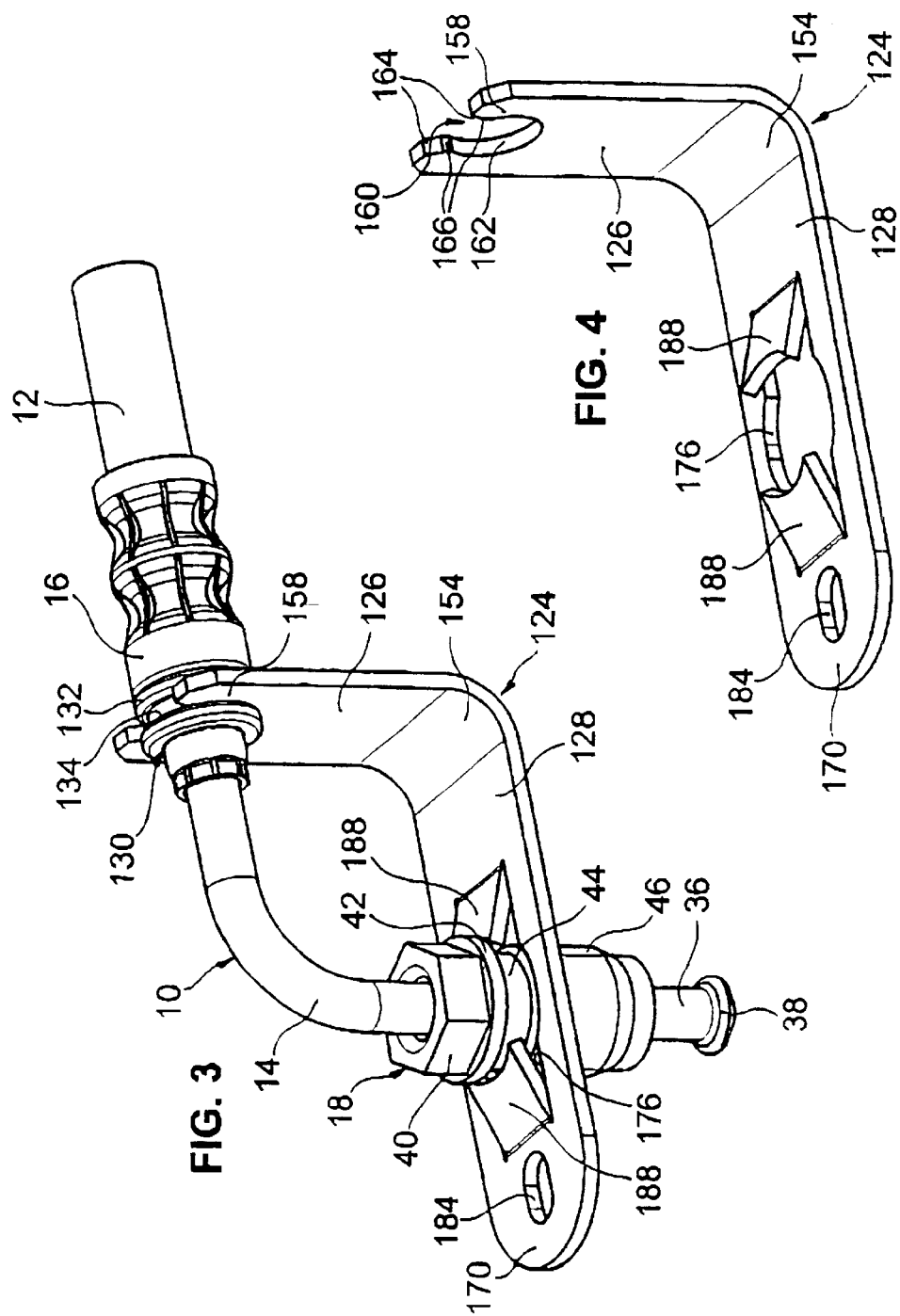

MOUNTING FOR PRESSURE LINE

The present invention relates to a mounting for a pressure line. In particular, the invention relates to a mounting, by means of which a pipe/hose brake line on or in a motor vehicle may be mounted on the brake caliper housing of a disk brake.

BRIEF DESCRIPTION OF PRIOR ART

Pressure lines with hose portions are used at points where connections in a hydraulic pipeline system have to be flexible. Thus, in the case of a motor vehicle braking system for example, a brake line having a hose portion connects the pipeline fixed to the bodywork with the wheel brake moving with the wheel suspension, e.g. the brake caliper of a disk drake. In this instance, the connection point between hose portion and wheel brake in particular has to satisfy strenuous requirements. Pressures have here to Ae transmitted which may easily be above 100 bar and the brake fluid may reach very high temperatures, even exceeding 100° C., during sharp braking, while the connection point is also subject to mechanical stress in the event of spring deflection of the wheel suspension, wherein it is essential that no leaks occur overall.

There is no shortage of proposals in the prior art relating to the construction of this connection point between hose portion and wheel brake. For example, the use of multi-part fittings, as known in principle from DE 30 04 421 C2, DE 35 14 315 C2 or DE 195 44 222 A1, is currently preferred for brake calipers. These stable fittings, with their solid construction, do reduce heat transfer from the brake caliper to the hose portion of the brake line, such that the latter cannot suffer any thermal overload. However, the structure of these fittings is of complex design. Thus, for instance, in the case of the ring fittings known from DE 30 04 421 C2 or DE 35 14 315 C2, in which an annular part connected with the hose portion surrounds a hollow screw concentrically there are at least two seal points requiring appropriate surface machining of the ring fitting and the brake caliper housing. Moreover, complex measures are provided to prevent rotation of the annular part of the fitting relative to the brake caliper housing. Consequently, these fittings alone account for the majority of the production costs for mass-produced brake lines.

The same applies with respect to the fitting known from DE 26 00 725 C2, which is fixed by means of a retaining spring from a spring steel strip.

In additions a construction of the connection point between the hose portion of the brake line and the wheel brake is known DE-OS 1 955 504, DE 42 30 889 A1, in which the hose portion is connected to a curved pipe part by means of a connector, which curved pipe part is in turn provided at the end with a fitting in the form of a union bolt for connection to a wheel brake pressure connection. The end of the pipe part extending through the union bolt comprises a sealing bead, which, when the union bolt is screwed into the pressure connection, is pressed tightly against a conical seal of the pressure connection. With this construction too, the hose portion of the brake line is effectively thermally decoupled from the wheel brake. However, shaking, impacts and vibrations during operation of the motor vehicle and relative movement between wheel suspension and bodywork upon spring deflection result in bending stresses at the pipe part of the brake line, which may lead, after extended use, to leaking of brake fluid at the connection point. The blocks proposed in DE 42 30 889 A1 and formed on the housing of the wheel brake, which accommodate the pipe part of the brake line between their parallel, mutually facing surfaces, are equally deficient.

Finally, DE 299 09 715 U1 discloses a mounting for fixing a corrugated hose. However, in the case of a continuous corrugated hose, the above-described mechanical problems, such as can occur with a pressure line comprising a hose portion and a pipe part, do not arise.

An object of the invention is therefore to provide a mounting of simple design for a pressure line, which assists or ensures secure and reliable connection of the pressure line to a pressure connection.

SUMMARY OF THE INVENTION

According to the invention, a mounting for a pressure line, which comprises a pipe part connected with a hose portion by means of a connector, which pipe part may be connected by means of a fitting to a pressure connection of a housing, has a retaining clip having a first portion, by means of which the pressure line may be supported at the connector or the pipe part, and a second portion connected rigidly with the first portion, by means of which second portion the retaining clip may be fixed to the housing via the fitting.

Thus, a mounting of extremely simple construction is provided as a low-cost replacement for the known ring fittings, in which with its first portion the retaining clip absorbs bending and torsional moments acting in particular via the hose portion of the pressure line and with its second portion transmits them on via the fitting into the housing, without the pipe part of the pressure line being exposed to excessive stresses. In other words, the pipe part is by-passed mechanically completely or at least in part by the retaining clip. Consequently, a pressure-tight connection of the pressure line to the housing is lastingly ensured. The first portion of the retaining clip may advantageously serve at the same time to space the hose portion of the pressure line from the housing by a predetermined amount, such that the hose portion is not subject to heat damage. It is additionally advantageous that no separate fastening means have to be provided for the retaining clip, the latter instead being fixed to the housing by its second portion by means of the fitting to be connected anyway to the pressure connection of the housing.

The first portion of the retaining clip may comprise an undercut slot at the end, in which the connector or the pipe part of the pressure line may be secured simply in the manner of a snap connection. Thus, premounting of the retaining clip on the pressure line is also advantageously possible.

In an alternative construction, the first portion of the retaining clip is terminally provided with a slot bounded by arms for receiving an intermediate part fitted to the connector and which can be fixed to the retaining clip in positive and non-positive manner through the plastic bending of the arms. Such a positive and non-positive fixing of the pressure line to the retaining clips in all directions is appropriate if high compulsive forces act on the pressure line, e.g. as a result of pronounced bending of the hose portion and which in the case of the aforementioned snap connection might lead to an unplanned release of the connection.

The intermediate part appropriately has a substantially U-shaped cross-section and is clipped onto an extension of the connector. It Is readily possible to subsequently fit such an intermediate part to the pressure line before the latter is fixed to the retaining clip in the above-described manner.

However, it is also conceivable for this intermediate part to be constructed as a ring part, which is engaged in the manner of a sleeve on the extension of the connector before the fitting is fitted to the pipe part of the pressure line.

On the facing sides of the first portion of the retaining clip the arms carry projections or clamps which, accompanied by the plastic beading of the arms, can be pressed into the preferably plastic intermediate part for fixing the latter to the retaining clip. Thus, in a very simple manner a reliable self-closure and force closure is obtained between the intermediate part and the retaining clip.

The retaining clip may be secured with its second portion resiliently between the pressure line fitting and the housing, for which purpose the second portion of the retaining clip is of resilient construction. Owing to this resilient securing of the second portion of the retaining clip, it is possible on the one hand to compensate pipe part contour tolerances without the retaining clip itself gripping the pipe part excessively. On the other hand, the housing does not require any particular machining at the bearing surface for the retaining clip. Furthermore, the elastic construction of the second portion prevents relative movement of the retaining clip in relation to the housing and thus also undesirable retaining clip rattling noises.

There are preferred alternatives for the resilient construction of the second portion of the retaining clip. For example, the second portion of the retaining clip may comprise an opening and develops, at its end remote from the first portion, into a bent flexible tongue, which has a further opening, wherein the fitting of the pressure line extends, when mounted on the housing, through the aligned openings in such a way that the retaining clip is clamped resiliently with its flexible tongue and its second portion between a flange on the fitting and the housing.

The end of the flexible tongue facing the first portion of the retaining clip is preferably offset in the direction of the second portion of the retaining clip and is supported on the second portion, the flexible tongue extending substantially parallel to the second portion of the retaining clip in the area of the opening formed in the flexible tongue, so that the latter can in an advantageous manner engage flat and in a clearly defined form on the flange of the fitting.

On the other hand, the second portion of the retaining clip may comprise an opening for the fitting of the pressure line, wherein flexible arms projecting in the area of the opening are provided on the second portion of the retaining clip, which flexible arms clamp the retaining clip resiliently between a flange on the fitting and the housing when the fitting is mounted on the housing.

The retaining clip may be secured against rotation relative to the housing when the pressure line fitting is mounted on the housing. According to preferred, simple embodiments of this anti-rotation means, the second portion of the retaining clip is located in form-fitting manner in a corresponding recess in the housing, has a locating hole, through which there extends a pin fixed to the housing, or is provided with a bevelled portion, which engages in a recess in the housing.

If the pipe part of the pressure line has to be bent, the first portion conveniently forms a predetermined angle with the second portion of the retaining clip, wherein the retaining clip is preferably provided with profiling for reinforcing purposes in the junction area between the first portion and the second portion.

The retaining clip may consist of spring band steel, such that the retaining clip may take the form of a low-cost bent stamping or precision-blanked part.

BRIEF DESCRIPTION OF THE DRAWINGS

The invention is described in more detail below with the aid of preferred exemplary embodiments and with reference to the attached drawings, wherein identical or similar parts are distinguished by corresponding reference numerals, preceded where applicable by an additional numeral. In the drawings:

FIG. 1 is a perspective view of a first embodiment of a pressure line mounting with retaining clip according to the invention, wherein the mounting is shown installed on a schematically illustrated housing;

FIG. 2 is a perspective view of the retaining clip shown FIG. 1;

FIG. 3 is a perspective view of a second embodiment of a pressure line mounting according to the invention, having a different retaining clip, the retaining clip being shown premounted on the pressure line;

FIG. 4 is a perspective view of the retaining clip shown in FIG. 3; and

DESCRIPTION OF THE PREFERRED EMBODIMENTS

Figure 5:
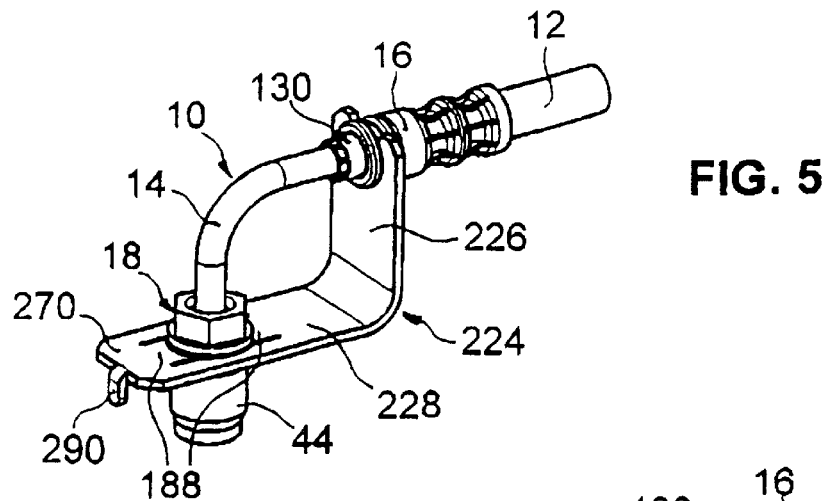
FIGS. 5 to 7 show perspective views, corresponding to FIG. 3, of variants of the second embodiment, comprising different retaining clips.

FIG. 1 shows a mounting for a pressure line 10, which comprises a hose portion 12, consisting primarily of an elastombric material, and a metallic pipe part 14, wherein the hose portion 12 is connected with the pipe part 14 by means of a connector 16 known per se, e.g. by crimping. A union bolt 13 is attached to the pipe part 14 as a fitting, by means of which union bolt 18 the pressure line 10 may be connected in fluid-tight manner to a pressure connection 20 of a housing 22, illustrated only schematically, e.g. of a brake caliper. In addition, the mounting has a retaining clip 24 preferably of spring band steel, having a first portion 26, by means of which the pressure line 10 may be supported at the connector 16 (or alternatively at the pipe part 14), and a second portion 28 connected rigidly with the first portion 26, by means of which second portion 23 the retaining clip 24 may be fixed to the housing 22 with the assistance of the union bolt 18, as will be described in more detail below.

The connector 16 of the pressure line 10 is provided at its end facing the pipe part 14 with a preferably resilient intermediate part 30, which is positioned on the pipe part 14 in the manner of a sleeve and comprises a flange 32, in which an encircling groove 34 is formed at the outer periphery. Starting from the connector 16, the pipe part 14 is bent by about 90° and extends through the union bolt 18. The free end 36 of the pipe part 14 extending downwards beyond the union bolt 18 in FIG. 1 is provided with a bead 38 to DIN 74 234.

The union bolt 18 is fixed to the pipe part 14 in the longitudinal direction, but may turn in the circumferential direction relative to the pipe part 14. FIG. 1 further shows that the union bolt 18 has a manipulating portion 40, which may be engaged by a spanner for the purpose of mounting the pressure line 10 on the housing 22. An annular flange 42 adjoins the manipulating portion 40 downwards thereof in FIG. 1. Finally, the union bolt 18 has a fastening portion 44 beneath the annular flange 42, which fastening portion 44 is provided with an external thread 46 in the exemplary embodiment shown.

The pressure connection 20 of the housing 22 comprises an internal thread (not shown), into which the union bolt 18 may be screwed with the external thread 46 on its fastening portion 44. When the union bolt 18 is screwed in, the bead 38 at the end 36 of the pipe part 14 is pressed in fluid-tight manner against a conical seal 48 of the pressure connection 20. It should further be noted in relation to the housing 22 that, for the purpose of greater clarity, said housing 22 is illustrated in FIG. 1 as being cut away at the upper end in FIG. 1. In actual fact, when the pressure line 10 is in the mounted state, the second portion 28 of the retaining clip 24 lies against the housing 22, Finally, in the embodiment shown, a blind hole 50 is additionally formed in the outer surface of the housing 22 facing the retaining clip 24, which blind hole 50 serves to accommodate a pin 52 to secure the retaining clip 24 against rotation.

In the case of the retaining clip 24 illustrated separately in FIG. 2 and bent from a sheet metal portion of constant width over its whole length, the first potion 26 forms a predetermined angle of around 90° with the second portion 28. For stiffening purposes, the retaining clip 24 may be provided with profiling 56 extending in the direction of longitudinal extension of the retaining clip 24 in or at the junction area 54 between the first portion 26 and the second portion 28.

As may be seen particularly well in FIG. 2, the first portion 26 of the retaining clip 24 comprises an undercut slot 60 at its free end 58, which slot comprises a partially cylindrical slot base 62 and insertion bevels 64. The internal spacing of the junction areas 66 between the slot base 62 and the insertion bevels 64 is kept slightly smaller than the internal diameter of the slot base 62 to form the undercut. In addition, a flange 68 may be embossed on the first portion 26 of the retaining clip 24 in the area of the slot base 62, in order to enlarge the inner circumferential surface of the slot base 62 in the axial direction. When the retaining clip 24 is premounted on the pressure line 10, the intermediate part 30 of the connector 16 is snapped into the slot 60 in the first portion 26 of the retaining clip 24 in the area of the groove 34 in the flange 32 or secured in the manner of a snap connection, as shown in FIG. 1.

When the pressure line 10 is mounted on the housing 22, the retaining clip 24 is fixed by its second portion 28 resiliently between the housing 22 and the union bolt 18, to which end the second portion 28 is preferably of resilient construction. More precisely, in the embodiment shown the second portion 28 of the retaining clip 24 develops at its end 70 remote from the first portion 26, via a cross-sectionally C-shaped junction portion 72, into a flexible tongue 14 bent relative to the second portion 28 by almost 180°, which flexible tongue 74 extends back towards the first portion 26 beyond the half-way point of the second portion 28. In FIG. 1 the flexible tongue 74 is bent upwards from the second portion 28, but the flexible tongue may in principle also be bent downwards.

The second portion 28 is additionally provided substantially centrally with a circular opening 76, which is aligned with an oval opening 78 at the end 80 of the flexible tongue 74 in the direction of longitudinal extension of the first portion 26 of the retaining clip 24. The opening 76 may also provided with an embossed flange 82 to increase the axial length of its inner circumferential surface. This flange 82 prevents the second portion from catching on the external thread 46 of the union bolt 18 during mounting of the retaining clip 24 or serves to guide the second portion 28 of the retaining clip 24 on the union bolt 18 of the pressure line 10. As FIG. 1 clearly reveals, when the pressure line 10 is mounted on the pressure connection 20 of the housing 22, the union bolt 18 extends with its fastening portion 44 through the aligned openings 76, 78 of the retaining clip 24 with slight radial play relative to the opening 76. The flexible tongue 74 of the retaining clip 24 lies resiliently against the annular flange 42 of the union bolt 18, while the second portion 28 of the retaining clip 24 is pressed resiliently against the outer surface of the housing 22 facing the retaining clip 24. As a result, the retaining clip 24 is clamped resiliently with its flexible tongue 74 and its second portion 28 between the annular flange 42 of the union bolt 18 and the housing 22 or held there with a defined prestressing force. The union bolt 18 here thus fulfils a double function: on the one hand, it forces the bead 38 at the end 36 of the pipe part 14 into a fluid-tight position relative to the conical seal 48 on the pressure connection 20 of the housing 22, while, on the other hand, it clamps the retaining clip 24, via its second portion 28, resiliently against the housing 22.

Furthermore, the second portion 28 comprises a locating hole 84, which is markedly smaller than the opening 76, is positioned substantially centrally between the opening 76 and the junction portion 72 (c.f. FIG. 1) and is aligned with an elongate hole 86 in the flexible tongue 74. When the union bolt 18 is mounted in the housing 22, the pin 52 fixed in the blind hole 50 in the housing 22 passes through the locating hole 84 in the second portion 28 and the elongate hole 86 in the flexible tongue 74, in order to secure the retaining clip 24 against rotation relative to the housing 22.

Finally, it should also be mentioned in this context that both the opening 78 and the elongate hole 86 in the flexible tongue 74 exhibit sufficient radial play relative to the fastening portion 44 of the union bolt 18 or relative to the pin 52 for neither the union bolt 18 nor the pin 52 to prevent the flexible tongue 74 from being resilient. It is immediately clear that, when the retaining clip 24 is in the mounted state, forces or moments acting on the connector 16 via the hose portion 12 of the pressure line 10 are introduced through the intermediate part 30 into the first portion 26 of the retaining clip 24, whence they are conveyed on via the second portion 28 of the retaining clip 24 and finally accommodated in relation to the housing 22 by the union bolt 18 or the pin 52, wherein neither is the pipe part 14 of the pressure line 10 unduly stressed nor is the sealing point between the bead 38 at the end 36 of the pipe part 14 and the conical seal 48 in the pressure connection 20 of the housing 22 impaired in any way.

The second embodiment illustrated in FIGS. 3 and 4 is described below only in respect of those features thereof which differ from the above-described first embodiment. The above statements relating to the function or operation of the retaining clip 124 still apply.

The retaining clip 124 is of altogether simpler construction than the retaining clip 24. Thus, flanges are not provided on the slot 160 and the opening 176, nor is profiling provided between the first and second portions 126, 128 of the retaining clip 124. Instead of a flexible tongue, the retaining clip 124 has flexible arms 188, projecting upwards in FIG.

4, in the area of the opening 176 for passage of the fastening portion 44 of the union bolt 18. These flexible arms 188 are formed by the provision of longitudinal slits on each side of the opening 176 and subsequent upward bending of the liberated parts of the second portion 128 of the retaining clip 124. When the pressure line 10 is mounted on the housing, the flexible arms 188 lie resiliently against the annular flange 42 of the union bolt 18 and the second portion 128 lies resiliently against the housing, such that the retaining clip 124 is clamped resiliently in place by means of its second portion 128. The retaining clip 124 is secured against rotation, in accordance with the first embodiment, by means of a pin fixed to the housing, which passes through the locating hole 184.

Although not shown in the Figures, the retaining clip may also be secured against rotation relative to the housing in that the sides of the second portion of the retaining clip are accommodated form-fittingly in a complementary recess, e.g. in a groove in the housing.

Figure 6:
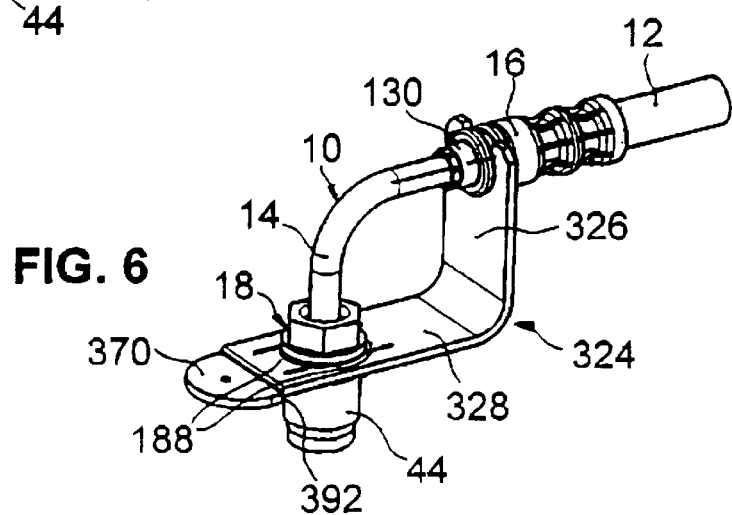
Figure 7:
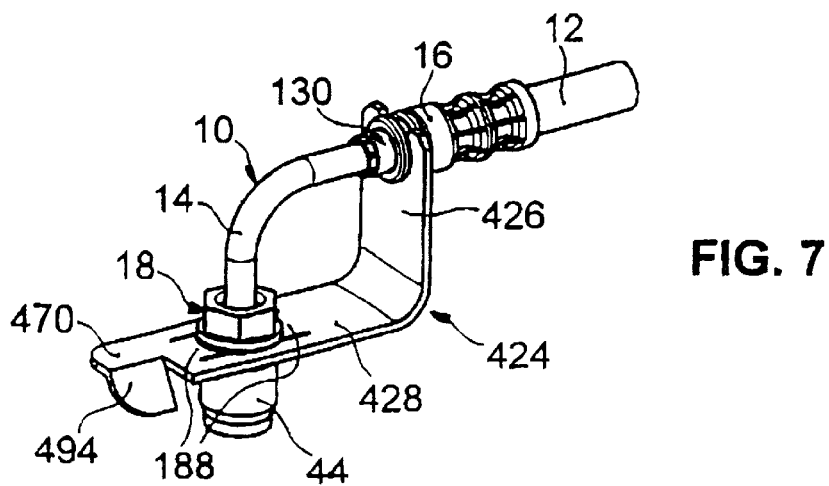
Figure 10:
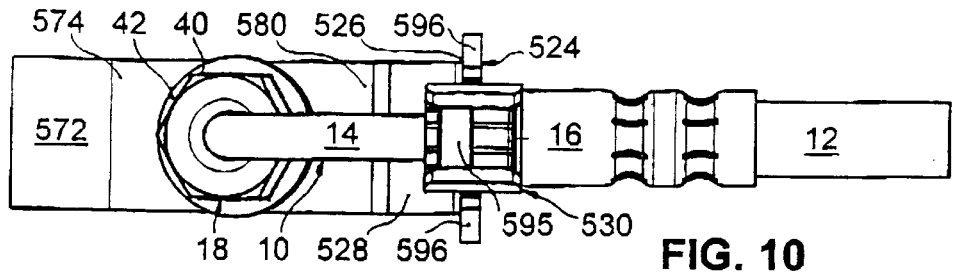
FIG. 10 is a plan view of the mounting shown in FIG. 8 from the top in FIG. 9.

Further simple alternative constructions of an anti-rotation means, which may be used in accordance with the respective requirements, are shown in FIGS. 5 to 7. Thus, according to FIG. 5, the second portion 228 of the retaining clip may comprise at its end 270 remote from the first portion 226 a lug 290 bent towards the housing which, when the retaining clip 224 is in the mounted state, engages in a corresponding recess in the housing. In FIG. 6, the end 370 of the second portion 328 remote from the first portion 326 of the retaining clip 324 is altogether downwardly offset to form a step 392, so as to engage form-fittingly behind an edge of the housing, for example, when the retaining clip 324 is in the mounted state. Finally, FIG. 7 shows a variant in which the end 470 of the second portion 428 remote from the first portion 426 of the retaining clip 424 is slit across approximately as far as the centre and the liberated part of the end 470 is bent downwards to form a bevelled portion 494, wherein the bevelled portion 494 engages behind a housing face for example when the retaining clip 424 is in the mounted state.

The third embodiment shown in FIGS. 8 to 11 is described hereinafter solely in connection with its features differing from the above-described embodiments. The above statements in connection with the function or action of the retaining clip, particularly with respect to the flexible tongue on the second portion of the retaining clip, apply in the same way.

Figure 9:
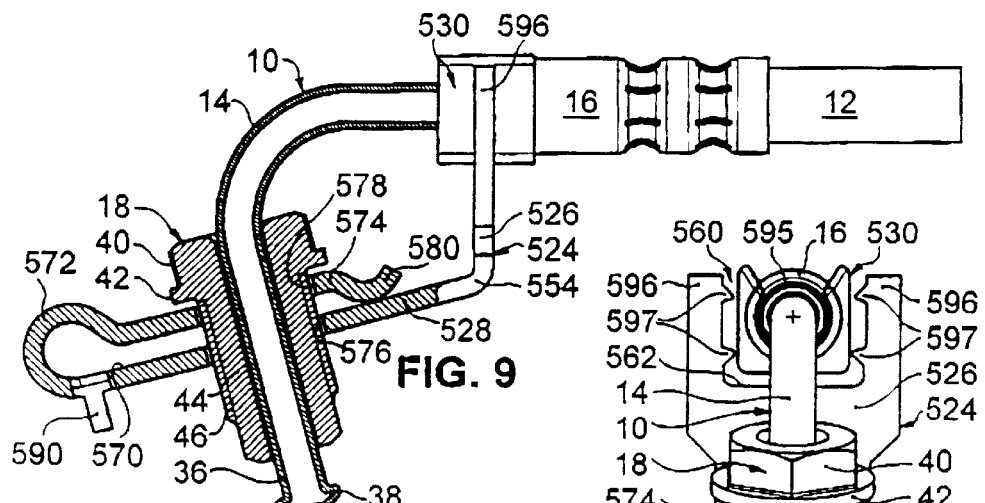
FIG. 9 is a broken open side view of the mounting shown in FIG. 8.
Figure 11:
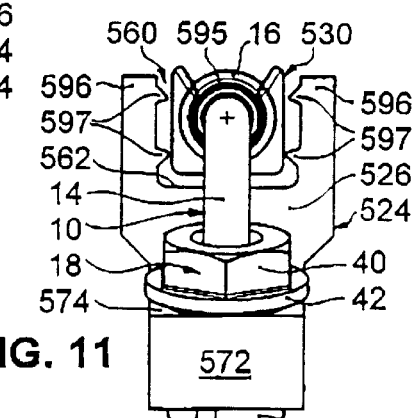
FIG. 11 a front view of the mounting shown in FIG. 8 from the left in FIG. 9.
Figure 8:
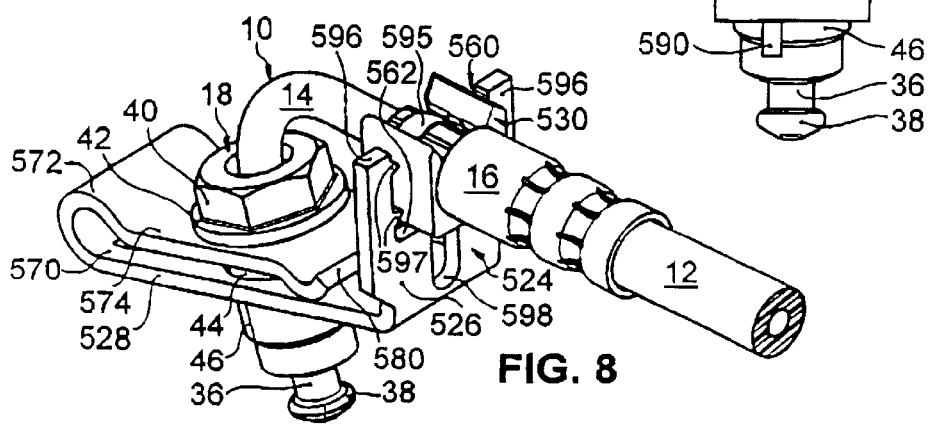
FIG. 8 is a perspective view of a third embodiment of a mounting for a pressure line having a retaining clip in accordance with the invention and which differs from the retaining clips of the preceding embodiments, said retaining clip being shown in a state prior to prefitting to the pressure line.

As can in particular be gathered from FIG. 9, in the third embodiment of the mounting pipe part 14, so as to comply with the fitting requirements, is more strongly bent than in the preceding embodiments. Thus, the second portion 528 of the retaining clip 524 forms an angle greater than 90° with the first portion 526 of the retaining clip 524 extending at right angles to the longitudinal axis of the connector 16 and, as shown in FIGS. 8 and 11, tapering towards the transition area 554.

In the vicinity of the first portion 526 of the retaining clip 524 it also differs from the preceding embodiments in connector with the manner of fixing the pressure line 10 to the retaining clip 524. According to FIGS. 8 and 10 here the connector 16 has an extension 595 crimped to the pipe part 14 and which has a smaller diameter than the remainder of the connection 16. Onto the extension 595 is clipped a preferably plastic intermediate part 530, which has a substantially U-shaped cross-section. In turn the intermediate part 530 can be fixed in positive and non-positive manner to the retaining clip 524, so that the extension 595 of the connector 16 cannot be released from the clip connection state with respect to the intermediate part 530.

For this purpose the first portion 526 of the retaining clip 524 is terminally provided with a slot 560 bounded by arms 596 for receiving the intermediate part 530 fitted to the connector 16. On the facing sides the arms 596 carry preferably pointed projections or clamps 597 which, accompanied by the plastic bending of the arms 596 towards one another can be pressed into the intermediate part 530 for fixing the latter to the retaining clip 524. The drawings show the arms 596 in the undeformed state in order to simplify representation. A further slot 596 extending downwards from the slot base 562 in FIG. 8 also ensures that the arms 596 can be bent sufficiently far inwards for fixing the intermediate part 530 to the retaining clip 524.

For the (pre)fitting of the retaining clip 524 to the pressure line 10 the intermediate part 530 clipped onto the extension 595 or the connector 16 is positioned by means of a not shown fitting device with respect to the retaining clip 524 before the arms 596 on the first portion 526 of the retaining clip 524 are bent, accompanied by plastic deformation, towards the inside of the slot 560 for the positive and non-positive fixing of the intermediate part 530. The projections 597 provided on the arms 596 penetrate the outer face of the intermediate part 530. Alternatively or additionally thereto, at least on its outer faces facing the arms on the first portion of the retaining clip, the intermediate part could also be provided with grooves, into which can be bent the arms for fixing the intermediate part to the retaining clip.

The second portion 528 of the retaining clip 524 is also given a different construction as compared with the previously described embodiment. As a torque support the second portion 528 is provided close to the transition portion 572 to the flexible tongue 574 with a downwardly directed sheet metal lug 590 in accordance with FIGS. 5 and 11.

The flexible tongue 574 is also bent by 18° C. compared with the second portion 528 of the retaining club 524, so at least in the area of the opening 578 formed in the flexible tongue 574, the latter extends substantially parallel to the second portion 528 of the retaining clip 524. The two openings 576, 578 in the second portion 528 and the flexible tongue 574 are made circular in a manner which is easy to manufacture. The internal diameter thereof is slightly larger than the external diameter of the external thread 46 of the union bolt 18 in order to provide a slight radial play. Finally the end 580 of the flexible tongue 574 facing the first portion 526 of the retaining clip 524 is offset in the direction of the second portion 529 of the retaining clip 524, i.e. downwards in FIG. 9 and is supported on the second portion 528.

A mounting for a pressure line, in particular a brake line, is disclosed, which comprises a pipe part connected to a hose portion by means of a connector, which pipe part may be connected by means of a fitting to a pressure connection of a housing, in particular of a brake caliper. According to the invention, a retaining clip is provided which has a first portion, by means of which the pressure line may be supported at the connector or the pipe part, and comprises a second portion connected rigidly with the first portion, by means of which second portion the retaining clip may be fixed to the housing via the fitting. Thus, a mounting of simple design is provided for the pressure line, which assists or ensures secure and reliable connection of the pressure line to the pressure connection.

It will be Understood that the invention is capable of modification and therefore is not to be limited to the precise details set forth. Rather, various modifications may be made

| List of reference numerals | |
|---|---|
| 10 | Pressure line |
| 12 | Hose portion |
| 14 | Pipe part |
| 16 | Connector |
| 18 | Union bolt |
| 20 | Pressure connection |
| 22 | Housing |
| 24, 124, 224, 324, 424, 524 | Retaining clip |
| 26, 126, 226, 326, 426, 526 | First portion |
| 28, 128, 228, 328, 428, 528 | Second portion |
| 30, 130, 530 | Intermediate part |
| 32, 132 | Flange |
| 34, 134 | Groove |
| 36 | End |
| 38 | Bead |
| 40 | Manipulating portion |
| 42 | Annular flange |
| 44 | Fastening portion |
| 46 | External thread |
| 48 | Conical seal |
| 50 | Blind hole |
| 52 | Pin |
| 54, 154, 554 | Junction area |
| 56 | Profiling |
| 58, 158 | End |
| 60, 160, 560 | Slot |
| 62, 162, 562 | Slot base |
| 64, 164 | Insertion bevel |
| 66, 166 | Junction area |
| 68 | Flange |
| 70, 170, 270, 370, 470, 570 | End |
| 72, 572 | Junction portion |
| 74, 574 | Flexible tongue |
| 76, 176, 576 | Opening |
| 78, 578 | Opening |
| 80, 580 | End |
| 82 | Flange |
| 84, 184 | Locating hole |
| 86 | Elongate hole |
| 188 | Flexible arm |
| 290, 590 | Lug |
| 392 | Step |
| 494 | Bevelled portion |
| 595 | Extension |
| 596 | Arm |
| 597 | Projection |
| 598 | Slot |

We claim:

1. A combination of a brake line, a brake caliper housing and a retaining clip for supporting said brake line with respect to said brake caliper housing,
    said brake line comprising a pipe part and a hose portion which are connected to each other by means of a connector, the pipe part being connected to a pressure connection of said brake caliper housing by means of a fitting,
    said retaining clip having a first portion and a second portion which are rigidly connected to each other, the first portion supporting said brake line at the connector or the pipe part, and the second portion having an opening through which the fitting of said brake line extends,
    wherein the second portion of said retaining clip has a means for resiliently securing said retaining clip to said brake caliper housing, said means extending between the fitting of said brake line and said brake caliper housing and holding the second portion of said retaining clip with a defined prestressing force against said brake caliper housing.

2. The combination according to claim 1, wherein at its end, the first portion of said retaining clip comprises an undercut slot, in which the connector or the pipe part of said brake line is secured in the manner of a snap connection.

3. A mounting according to claim 1, wherein the first portion of the retaining clip is terminally provided with a slot bounded by arms for receiving an intermediate part fitted to the connector and which is positively and non-positively fixable to the retaining clip by the plastic bending of the arms.

4. A mounting according to claim 3, wherein the intermediate part has a substantially U-shaped cross-section and the connector has in extension onto which the intermediate part is clipped.

5. A mounting according to claim 3, wherein the arms on the first portion of the retaining clip carry projections on the facing sides and which, accompanied by a plastic bending of the arms, can be pressed into the preferably plastic intermediate part for fixing the latter to the retaining clip.

6. The combination according to claim 1, wherein said retaining clip consists of spring band steel.

7. A mounting according to claim 1, wherein the second portion of the retaining clip comprises an end remote from the first portion and an opening, and develops, at said end remote from the first portion, into a bent flexible tongue which has a further opening, wherein the fitting of the pressure line, when mounted on the housing, extends through the aligned openings in such a way that the retaining clip is clamped resiliently with its flexible tongue and its second portion between a flange on the fitting and the housing.

8. A mounting according to claim 7, wherein the end of the flexible tongue facing the first portion of the retaining clip is offset in the direction of the second portion of the retaining clip and is supported on the second portion, the flexible tongue extending substantially parallel to the second portion of the retaining clip in the vicinity of the opening formed in the flexible tongue.

9. The combination according to claim 1, wherein said means for resiliently securing comprises flexible arms projecting in the area of the opening, said flexible arms being provided on the second portion of said retaining clip and clamping said retaining clip resiliently between a flange on the fitting and said brake caliper housing.

10. The combination according to claim 1, wherein said retaining clip is secured against rotation relative to said brake caliper housing, to which end the second portion of said retaining clip has a locating hole through which there extends a pin secured to said brake caliper housing.

11. The combination according to claim 1, wherein said retaining clip is provided with a stiffening corrugation for reinforcing the junction area between the first portion and the second portion.

* * * * *